A. DE AGUIAR.
PLATFORM SCALE.
APPLICATION FILED JAN. 15, 1918.
1,271,440.
Patented July 2, 1918.
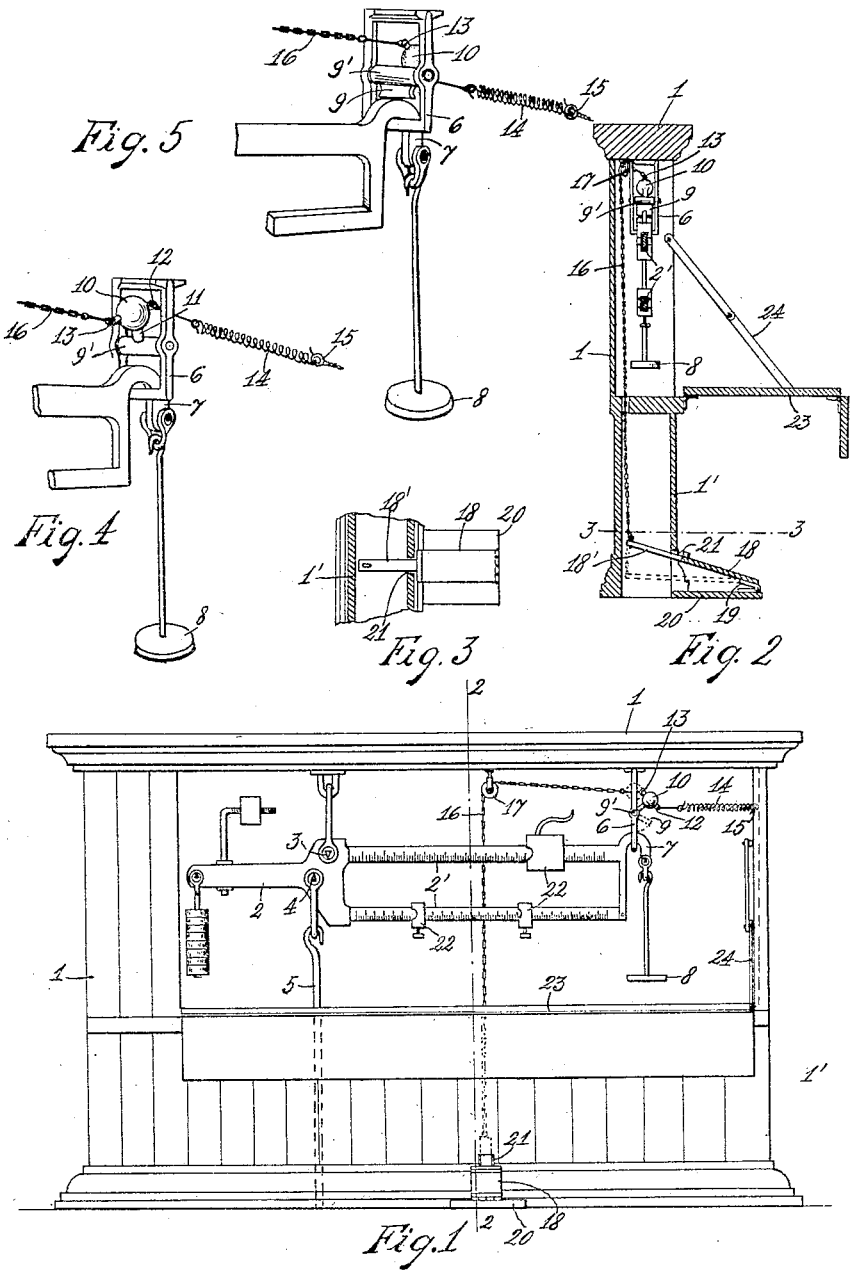

UNITED STATES PATENT OFFICE.

ABELARDO DE AGUIAR, OF HABANA, CUBA.

PLATFORM-SCALE.

1,271,440.  Specification of Letters Patent.  Patented July 2, 1918.

Application filed January 15, 1918. Serial No. 211,980.

*To all whom it may concern:*

Be it known that I, ABELARDO DE AGUIAR, a citizen of the Republic of Cuba, and a resident of Habana, Republic of Cuba, have invented certain new and useful Improvements in Platform-Scales, of which the following is a full, clear, and exact specification.

This invention relates to platform-scales, and its object is to provide platform-scales with treadle operating means connected to pivoted stop-pieces actuating upon the graduated scale-beam so that on taking the weight of any object or load placed on the platform, it may not be necessary to raise said stop piece with the hands to effect the weight, but instead said operation can be performed by the operator directly from his seat, thus rendering advantages of ease and rapidity to the weighing operation and permitting the making of a larger number of weights in a certain period.

Further, at present some times it happens that when the stop piece is in a raised position and therefore the graduated scale-beam free, if by virtue of carelessness of the operator, some load or weight comes onto the platform, there is produced such an abrupt shock of the scale-beam on its suspension knives that nearly always is occasioned the sliding of bearing points of the knives and also the loss of even balance of the scale all which produce erroneous weights. Even sometimes the platform suspension rods are fractured thus rendering useless the scale.

All of these disadvantages are prevented with the improvement object of this invention, since at the end of each weighing operation, the locking stop-piece of the graduated scale-beam is automatically actuated to prevent any oscillation, whereby a constant security in the operation of the scale is obtained, without being exposed to accidents and fractures.

In the annexed drawings:

Figure 1 is a front elevation of a scale mounted on its frame, showing applied thereto the improvement forming the subject matter of this invention.

Fig. 2 is a vertical cross-section on line 2—2 of Fig. 1.

Fig. 3 is a horizontal section on line 3—3 of Fig. 2.

Fig. 4 is a perspective detail view showing the free position of the end hook of the graduated scale-beam.

And Fig. 5 is a similar perspective detail view showing said hook in its lock position.

The platform-scale comprises a wooden frame 1, a scale-beam 2 with its fulcrum point on 3, and from which leads on 4 the hook end rod 5 that goes to the platform (not shown) and transmits to the scale-beam the action of the weight placed on the platform, 6 being the suspended clasp from the upper part of the frame to brace the hook 7 of the fork-shaped graduated arm 2' of scale-beam. From this scale beam hangs the pan 8 for the weights, and 9 the pivoted stop-piece in said clasp for letting loose or locking said hook 7. The invention consists in providing the revolving shaft 9' of stop-piece 9 with a counter-weight 10 preferably in the form of a solid ball placed at the end of a short stem 11 projecting from said shaft 9' at an oblique angle with respect to the radial plane of the stop-piece 9 or diametrally opposed to this in a substantial manner. On I-bolts 12 and 13 projecting from opposite sides of said counterweight 10 are respectively fixed the end of a helical spring 14 having its other end connected to an I-bolt 15 fixed to a side of frame 1, and the end of a chain 16 extended first in an almost horizontal direction and passing around a small pulley 17 suspended from the top of the frame to direct itself downward passing through the lower hollow part 1' of frame 1 until being connected to the reduced wide end 18' of a treadle 18. This treadle 18 is mounted by means of a hinge 19 on the floor 20 immediate to the platform of the scale, the reduced end 18' of said treadle passing to the interior of the frame 1 through a narrow opening 21 formed in said portion 1' of the frame.

The operation of the scale is as follows: The helical spring 14 aided by the counterweight 10 normally tends to maintain in a fallen position the pivoted stop-piece 9 so that the latter may lock the hook 7 of the scale-beam 2, but when the treadle 18 is pressed on the floor, the chain 16 pulls upward the counterweight 10 against the elastic action of the spring 14 and compels the stop-piece 9 to turn to the outer side rotating on its shaft 9', whereby the hook 7 is freed and the operation of balancing the scale can be effected by conveniently running the weights 22. Once the weight is effected, as soon as the treadle 18 is let loose, the spring 14 compels the stop-piece 9 to return to its fallen position on the hook 7 of the graduated scale-beam 2, aided by the gravity action of the counterweight 10, the hook 7 being retained in its fixed position.

The weigher being seated in front of the hinged folding table 23 suspended from frame 1 by arm 24, will actuate with the foot the treadle 18. If at any time the weigher is out of his place and some load inadvertently enters the platform, there will not occur any abrupt shock in the scale, because the hook 9 of the graduated scale beam 2 will always be retained in its fixed position by stop-piece 9.

What I claim is:

1. In a platform scale the combination of a graduated scale-beam, a pivoted stop piece therefor, a platform scale frame, a spring connecting the pivoted stop piece of the graduated scale-beam to a fixed portion of the platform scale frame, a treadle, and means connecting said stop piece to said treadle for raising said stop piece against the elastic action of the spring and vice-versa.

2. In a platform scale, the combination of a counter-weight, a rotating shaft, a locking stop piece, a graduated scale-beam to which said lock piece is applied, a scale frame, the counter-weight being mounted upon the rotating shaft of the locking stop piece of the graduated scale-beam opposite the stop piece in a substantial manner, a spring connecting said counter-weight to a fixed portion of the scale frame, a treadle, and means connecting said counter-weight to said treadle for raising said stop piece against the elastic action of the spring and vice-versa.

3. In a platform scale, the combination of a steel beam provided with a locking stop-piece, a rotating shaft, a counter-weight mounted thereon opposite the stop-piece, a spring connecting said counter-weight to a fixed portion of the same scale frame, a treadle on the floor of the scale, and means connecting said treadle to said counter-weight and passing around suspending means from the top of the scale frame.

In witness whereof I affix my signature.

ABELARDO DE AGUIAR.

Copies of this patent may be obtained for five cents each, by addressing the "Commissioner of Patents, Washington, D. C."